(12) United States Patent
Hayashi

(10) Patent No.: US 6,192,259 B1
(45) Date of Patent: Feb. 20, 2001

(54) PORTABLE RADIO APPARATUS HAVING FUNCTION FOR COMPRESSING AND TRANSMITTING DATA

(75) Inventor: Keiichi Hayashi, Tokyo (JP)

(73) Assignee: NEC Corporation, Tokyo (JP)

(*) Notice: Under 35 U.S.C. 154(b), the term of this patent shall be extended for 0 days.

(21) Appl. No.: 08/990,254

(22) Filed: Dec. 15, 1997

(30) Foreign Application Priority Data

Dec. 17, 1996 (JP) .................................................. 8-337317

(51) Int. Cl.[7] ...................................................... H04Q 7/32
(52) U.S. Cl. ........................ 455/575; 455/550; 455/412; 455/556; 455/557; 455/552; 455/421; 455/422; 455/432; 455/72
(58) Field of Search .................................... 455/550, 575, 455/414, 412, 556, 557, 552, 553, 421, 422, 95, 432, 72

(56) References Cited

U.S. PATENT DOCUMENTS 5,617,468 * 4/1997 Nojima et al. ..................... 455/421
5,802,469 * 9/1998 Nounin et al. ..................... 455/421
5,920,826 * 7/1999 Metso et al. ...................... 455/557

FOREIGN PATENT DOCUMENTS 4-238421 8/1992 (JP) .
5-183624 7/1993 (JP) .
6-224838 8/1994 (JP) .

* cited by examiner

*Primary Examiner*—Fan Tsang
*Assistant Examiner*—Keith Ferguson
(74) *Attorney, Agent, or Firm*—Ostrolenk, Faber, Gerb & Soffen, LLP

(57) ABSTRACT

When the user of a portable radio apparatus performs an operation for transmitting data outside a communication service area, the data to be transmitted is compressed in a compression section 6, and stored in a compressed data memory 13. When the user moves within the communication service area, the stored compressed data is automatically transmitted. On the other hand, when destination information for the transmitted data already exists, only the transmitted data is added to the destination information already registered, and transmitted in a batch. Alternatively, if the destination has a function for decompressing compressed data, the compressed transmitted data is transmitted in a batch, while, if the destination does not have the function for decompression compressed data, the compressed transmitted data is decompressed and transmitted.

13 Claims, 14 Drawing Sheets

Fig.2

| INFORMATION ON SURROUNDING BASE STATIONS | USER DATA 1 FOR TERMINAL 1 | FREE LINE INFORMATION | FREE LINE INFORMATION | SYNCHRONIZATION INFORMATION |
|---|---|---|---|---|

Fig.4

|   | 1 | 2 | 3 | 4 | 5 | 6 | 7 | 8 | 9 | 0 |
|---|---|---|---|---|---|---|---|---|---|---|
| 1 | ア(A) | イ(I) | ウ(U) | エ(E) | オ(O) | A | B | C | D | E |
| 2 | カ(KA) | キ(KI) | ク(KU) | ケ(KE) | コ(KO) | F | G | H | I | J |
| 3 | サ(SA) | シ(SI) | ス(SU) | セ(SE) | ソ(SO) | K | L | M | N | O |
| 4 | タ(TA) | チ(TI) | ツ(TU) | テ(TE) | ト(TO) | P | Q | R | S | T |
| 5 | ナ(NA) | ニ(NI) | ヌ(NU) | ネ(NE) | ノ(NO) | U | V | W | X | Y |
| 6 | ハ(HA) | ヒ(HI) | フ(HU) | ヘ(HE) | ホ(HO) | Z | : | ' | ? | . |
| 7 | マ(MA) | ミ(MI) | ム(MU) | メ(ME) | モ(MO) | ァ(a) | ィ(i) | ェ(e) | ォ(o) | ッ(tu) |
| 8 | ヤ(YA) | ( | ユ(YU) | ) | ヨ(YO) | ャ(ya) | ュ(yu) | ョ(yo) | — |   |
| 9 | ラ(RA) | リ(RI) | ル(RU) | レ(RE) | ロ(RO) | 1 | 2 | 3 | 4 | 5 |
| 0 | ワ(WA) | ヲ(WO) | ン(N) | " | " | 6 | 7 | 8 | 9 | 0 |

Fig.5

| MESSAGE NO. | CONTENT OF CALL | MESSAGE NO. | CONTENT OF CALL |
|---|---|---|---|
| 01 | URGENT | 21 | TO COMPANY |
| 02 | MAKE A CALL | 22 | AUTOMATIC ANSWERING AND RECORDING |
| 03 | COME BACK IMMEDIATELY | 23 | TO YOUR HOUSE |
| 04 | GATHER | 24 | AS USUAL |
| 05 | GO FIRST | 25 | PLEASE COME TO |
| 06 | GO IMMEDIATELY | 26 | SORRY |
| 07 | INTERRUPT | 27 | SCHEDULED |
| 08 | CHANGE | 28 | THANK YOU |
| 09 | SEND FAX | 29 | SORRY TO TROUBLE YOU |
| 10 | WAIT FOR INSTRUCTION | 30 | ? |
| 11 | I WILL COME FIRST | 31 | I WILL WATE FOR YOU |
| 12 | I WILL RETURN FIRST | 32 | PLEASE WAIT FOR ME |
| 13 | I WILL BE LATE | 33 | AT○○:○○ |
| 14 | GUEST WAITING FOR YOU | 34 | AT YOUR CONVENIENT TIME |
| 15 | TROUBLE | 35 | AT ACCUSTOMED PLACE |
| 16 | RESERVATION OK | 36 | RESERVATION |
| 17 | I WILL COME IMMEDIATELY | 37 | EXECUTE |
| 18 | IT'S OK | 38 | END |
| 19 | IT'S NG | 39 | WOULD YOU PLEASE |
| 20 | UNDERSTAND | 40 | DO |

Fig.7

(a) DO YOU WISH RESERVATION ?

(b) <u>DO</u> YOU WISH <u>RESERVATION</u> <u>?</u>

(c)
A. <u>DO</u> YOU WISH <u>RESERVATION</u> <u>?</u>
B. <u>DO</u> YOU WISH <u>RESERVATION</u> ?
C. <u>DO</u> YOU WISH RESERVATION <u>?</u>
D. <u>DO</u> YOU WISH RESERVATION ?
E. DO YOU WISH <u>RESERVATION</u> <u>?</u>
F. DO YOU WISH <u>RESERVATION</u> ?
G. DO YOU WISH RESERVATION <u>?</u>
H. DO YOU WISH RESERVATION ?

Fig.8

| | 8a | 8b |
|---|---|---|
| A. | [ [40U780503056805829492880 [ [36 [ [30 | ····34DIGITS |
| B. | [ [40U780503056805829492880 [ [36U769 | ····34DIGITS |
| C. | [ [40U7805030568058294928804810491048571640293039 [ [30 | ····52DIGITS |
| D. | [ [40U78050305680582949288048104910485716402930393969 | ····50DIGITS |
| E. | U719308050305680582949492880 [ [36 [ [30 | ····34DIGITS |
| F. | U7193080503056805829492880 [ [36U769 | ····34DIGITS |
| G. | U71930805030568058294928804810491048571640293039 [ [30 | ····52DIGITS |
| H. | U71930805030568058294928048104910485716402930393U769 | ····50DIGITS |

Fig. 13

| CONNECTION REQUEST INFORMATION | ORIGINATING ID INFORMATION | TERMINATING ID INFORMATION | COMPRESSION FORM INFORMATION | ADDITIONAL INFORMATION |

Fig. 14

| CONNECTION RESPONSE INFORMATION | ORIGINATING ID INFORMATION | TERMINATING ID INFORMATION | DECOMPRESSION FORM INFORMATION | ADDITIONAL INFORMATION |

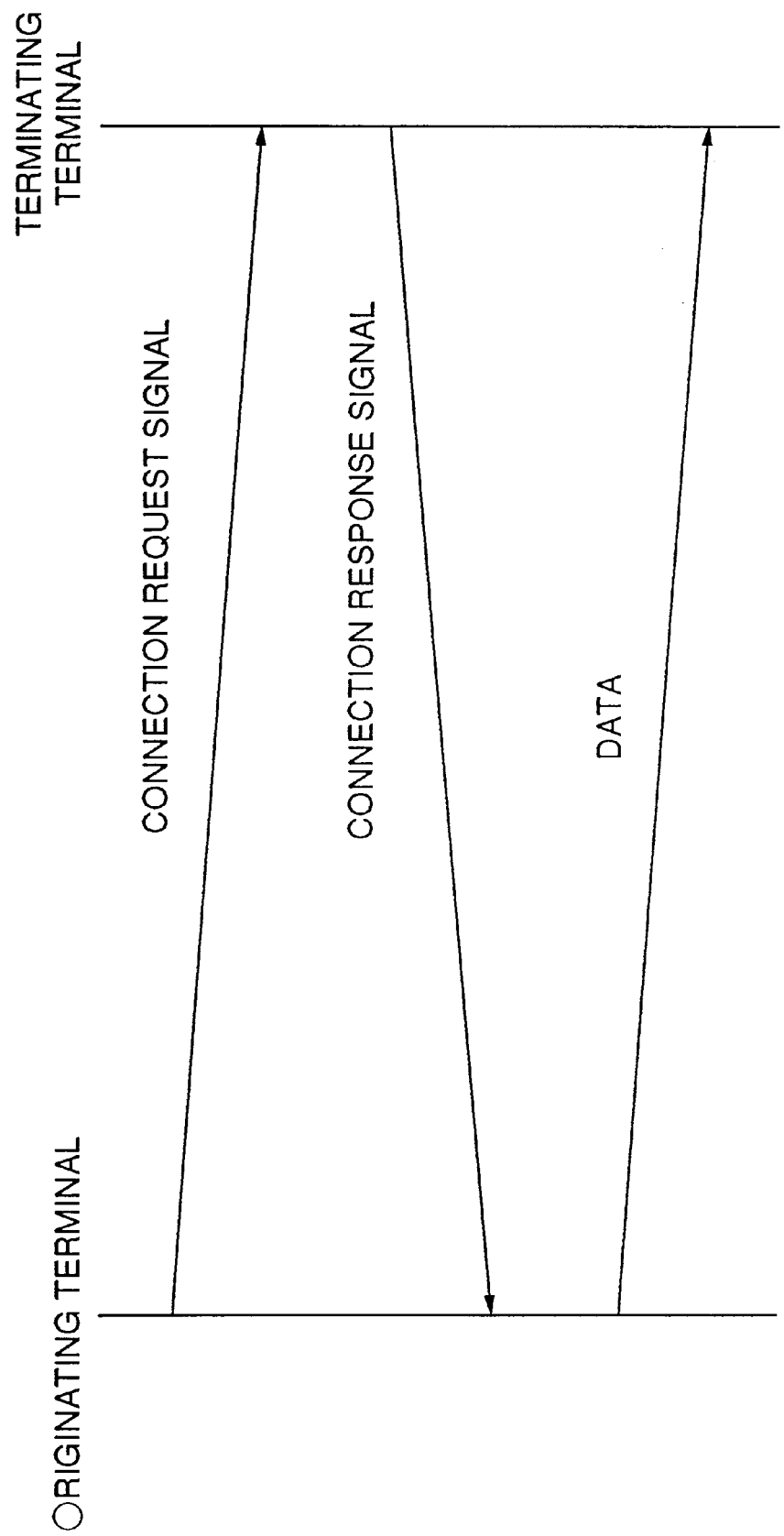

PORTABLE RADIO APPARATUS HAVING FUNCTION FOR COMPRESSING AND TRANSMITTING DATA

BACKGROUND OF THE INVENTION

1. Field of the Invention

The present invention relates to a portable radio apparatus for transmitting and receiving a signal to and from a base station in a communication service area.

2. Description of the Related Art

Usually, a portable radio apparatus can communicate with a desired destination only when it is within an area where it can receive radio data from a base station of communication services, or a communication service area. Outside the communication service area, the portable radio apparatus cannot communicate with the desired destination. For the reason, a conventional portable radio apparatus, for example, an electronic organizer incorporating a radio modem, continuously displays on its display area information indicating whether or not the portable radio apparatus is within a communication service area to prevent its user located outside a communication service area from repeating an transmitting operation. In this manner, the user ascertains that his or her portable radio apparatus is located within a communication service area from content of the display area before transmission of data. Thus, such electronic organizer can reduce unnecessary transmitting operation by the user outside the communication service area.

However, in such portable radio apparatus, even if the user performs an operation for transmitting data outside a communication service area, he or she cannot transmit data until the portable radio apparatus enters into a communication service area. Therefore, the user should wait to transmit data until the portable radio apparatus enters into the communication service area. Alternatively, the user should return in communication service area as soon as possible. In addition, to transmit data to a desired destination, the user should ascertain that the portable radio apparatus is in a communication service area by purposely viewing the display area before he or she performs a transmission operation.

Japanese laid-open patent application heisei 6-224838 discloses a mobile telephone set in which the mobile telephone set determines whether it exists within a service area, and stores in a memory a phone number of a destination which is inputted while the telephone was located outside the service area. When the mobile telephone set enters into a service area, it automatically transmits the phone number stored in the memory, and connects a line with the destination for call.

Japanese laid-open patent application heisei 4-238421 discloses an automatic re-originating system which, when a mobile station moves outside a service area and becomes incapable of receiving data from a base station, the base station stores such data together with the phone number of the mobile station therein. When the mobile station returns to the service area, the base station automatically sends the stored data to the mobile station based on a calling signal from the mobile station in the service area.

Japanese laid-open patent application heisei 5-183624 discloses a radio telephone set in which, when an originating call arrives at a parent telephone set from a base station, the parent telephone set determines whether or not a child telephone set is located outside a radio wave coverage. When the parent telephone set determines that the child telephone set is located outside the radio wave coverage from the parent telephone set, that is, when a call cannot be established between the parent and the child telephone sets, the parent telephone set temporarily stores the message. When the child telephone set returns within the radio wave coverage from the parent telephone set, the parent telephone set sends the message to the child telephone set.

All of the foregoing systems send temporarily stored data to an applicable destination mobile station in the order that they were stored. Thus, if a plurality of data for the same destination mobile station are stored, the plurality of data should be individually sent to the same destination mobile station, Therefore, the number of transmission and receiving of data increases, so that the communication line cannot be efficiently used.

The mobile telephone set disclosed in Japanese laid-open patent application heisei 6-224838 in particular increases the number of transmission of the stored data, leading to increase of battery consumption. Therefore, the working time is shortened for the mobile station.

In addition, if the number of phone numbers and messages being stored increases, it is difficult to apply such conventional technologies to a portable radio apparatus with limited amount of memories which can be provided for the apparatus. In addition, it is necessary to previously provide a large capacity of memory for a portable radio apparatus not limited for the amount of memory which can be mounted. Therefore, the size of the apparatus itself cannot be reduced.

SUMMARY OF THE INVENTION

In view of the above, an object of the present invention is to provide a portable radio apparatus which can efficiently transmit data reserved for transmission outside a communication service area to a desired destination when the data is automatically transmitted within the communication service area.

Another object of the present invention is to provide a portable radio apparatus which can reserve much amount of data with a smaller capacity of memory for transmission when data is reserved for transmission outside the communication service area.

To attain the above objects, the portable radio apparatus of the present invention includes a memory for storing data to be transmitted and destination information outside a communication service area, data compression section for compressing said transmitted data, and transmission section for automatically transmitting said transmitted data based on said destination information within the communication service area.

Therefore, according to the present invention, since a plurality of data are transmitted together to one destination with only one transmission operation, it is possible to reduce the number of transmission and transmission time of reserved data as a whole, so that a communication line can be effectively utilized.

In another aspect, the portable radio apparatus of the present invention includes a memory for storing transmitted data and destination information outside a communication service area, data compression section for compressing the transmitted data, data decompression section for decompressing the transmitted data compressed by the data compression section, and transmitter section for automatically transmitting the transmitted data based on the destination information within the communication service area.

In addition, the present invention further includes determination section for determining whether or not the destination information has been stored in the memory, appending section for appending only the transmitted data to the destination information stored in the memory when the destination information is determined to be already stored in the memory, and transmitter section for automatically transmitting a plurality of transmitted data stored in the memory in a batch based on the destination information in the communication service area.

Furthermore, the present invention further includes determination section for determining whether or not the destination has data decompression section, and transmitter section for automatically transmitting the transmitted data to the destination stored in the memory based on the result of determination by the determination section.

With such arrangement, according to the present invention, when the user performs a transmission operation outside a communication service area, the transmitted data is compressed and temporarily held together with the destination information. When the portable radio apparatus moves within the communication service area, that is, when it returns to a state able to communicate, the transmitted data held is automatically transmitted.

In addition, when the user performs transmission operation of data outside the communication service area, it is confirmed whether or not destination information of transmitted data or an identification number of the destination is already registered, only the transmitted data is appended to the destination information when the destination information is already registered. When the data is transmitted, the transmitted data for the destination information is transmitted in a batch.

Furthermore, when the destination has a decompression function for decompressing compressed data, all transmitted data is transmitted to the destination in the compressed state in a batch. When the destination does not have the decompression function for decompressing compressed data, the compressed transmitted data is decompressed, and then transmitted.

In addition, if the user performs transmission operation of data outside a communication service area, since transmitted data is compressed and stored in a memory, it is possible to reserve for transmission much data with less memory capacity, so that the body of portable radio apparatus can be reduced in its size.

BRIEF DESCRIPTION OF THE DRAWINGS

These and other objects, features and advantages of the invention will become more fully apparent from the following detailed description taken in conjunction with accompanying drawings.

FIG. 2 is a preferred example of format of radio signal used for the portable radio apparatus shown in FIG. 1.

FIG. 4 is a preferred example of free message conversion matrix table being stored in a compression section 6 shown in FIG. 1.

FIG. 5 is a preferred example of routine message dictionary being stored in a compression section 6 shown in FIG. 1.

FIG. 7 is an example of combination pattern of free message data and routine message data in transmitted data based on the data compressing operation shown in FIG. 6.

FIG. 8 is an example of conversion pattern of the transmitted data being transformed into numeric data based on the combination pattern shown in FIG. 7.

FIG. 13 is a preferred example of data structure of connection request signal in starting data transmission from the portable radio apparatus *shown in FIG. 1.

FIG. 14 is a preferred example of data structure of connection response signal in starting data transmission from the portable radio apparatus shown in FIG. 1.

FIG. 15 is a sequence of the data transmission method shown in FIG. 12.

DETAILED DESCRIPTION OF THE PREFERRED EMBODIMENT

The arrangement of the portable radio apparatus according to the present invention, preferably a personal digital assistant (PDA) or personal intelligent communicator (PIC) is described with reference to FIG. 1.

Figure 1:
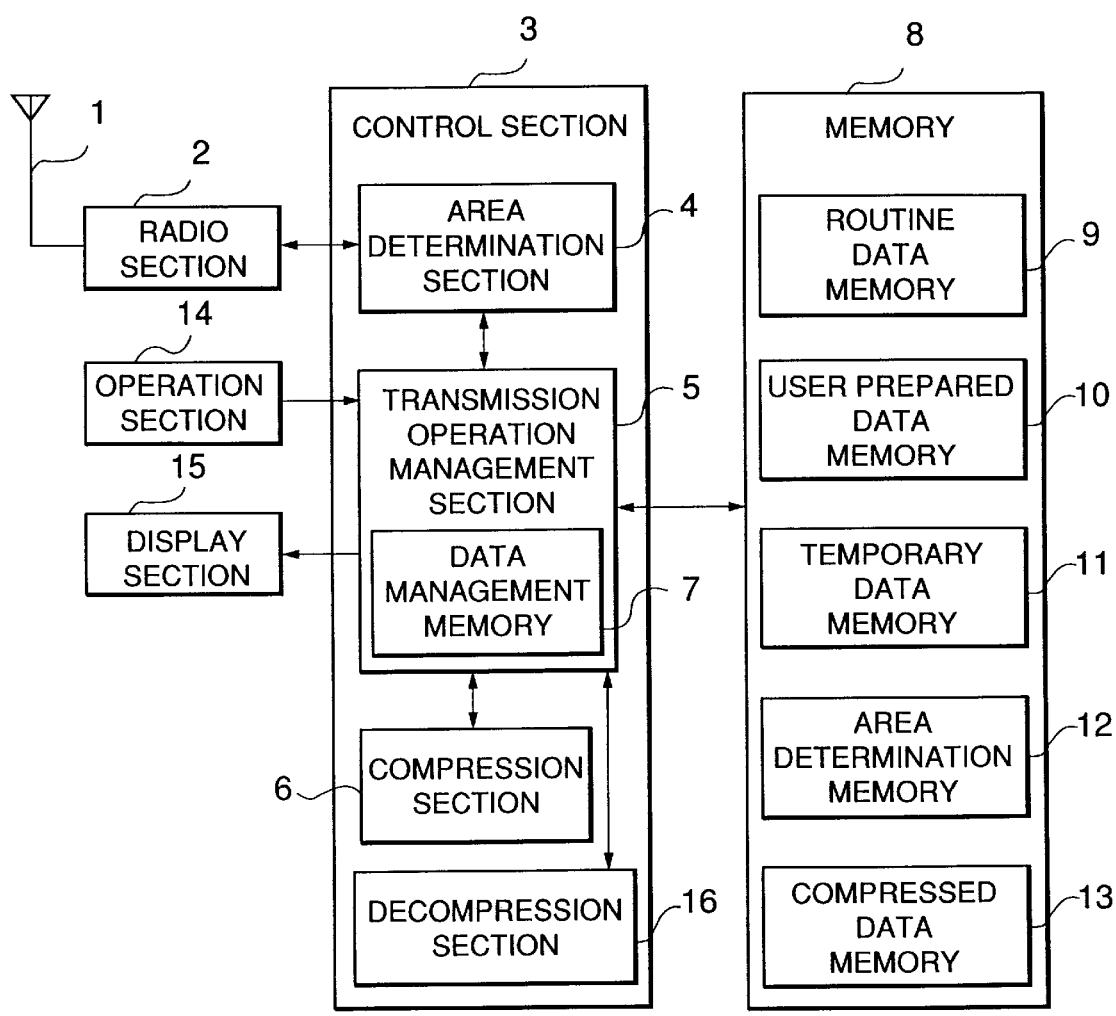
FIG. 1 is the arrangement of a preferred embodiment of the portable radio apparatus according to the present invention.

Referring to FIG. 1, a radio signal from a base station (not shown) is received by a radio section 2 through a transmission/receiving antenna 1. The radio section 2 measures an analog voltage corresponding to received electric field density, for example, a value of a received signal strength indicator (RSSI), for a predetermined first time interval, for example, 5 millisecond interval. The measured analog value is transmitted to an area determination section 4 in the control section 3. The area determination section 4 converts the detected analog voltage value into a digital voltage value through analog/digital conversion. The digital voltage value is compared with a threshold value previously stored in the area determination section 4 to determine whether or not the portable radio apparatus is within a communication service this. The result of area determination is stored in an area determination memory 12 and is updated at a predetermined time interval, for example, 100 milliseconds, which is longer than the first time interval.

Description is given on a preferred example of format of a radio signal used in the portable radio apparatus shown in FIG. 1 with reference to FIG. 2.

Referring to FIG. 2, information on surrounding base stations, or channel information, is information for notifying a terminal of information on base stations around a base station to which the terminal registers its location. The information on surrounding base stations contains information of surrounding base stations around the base station to which the terminal registers its location on frequencies and areas to which they belong, or the like. When the terminal moves to another area, it uses the information on surrounding base stations to search for a new base station.

User data 1 for terminal 1 is data on the terminal 1 registered in the system. The user data 1 for terminal 1 contains an upper layer of the terminal, or data to be processed by an application. "Data for terminal 1" indicates that an ID making it clear that the data is for the terminal 1 is contained.

Free line information is data transmitted when the base station does not have data to be transmitted for a down channel. The free line information is also called an IDLE packet.

Synchronization information is information for notifying timing on data reception between the base station and the terminal, or the like.

In the portable radio apparatus according to the present invention, when the terminal registers its location, the system determines in which area the terminal registering its location is located. Data to the terminal, or data used by an application, is transmitted to the area for which the location is registered. In addition, for data transfer, all terminals receive down data or all data transmitted from the base station. The terminal performs predetermined processing if data from the base station is data for it, or discards the data if it is not for the terminal. Each terminal determines whether or not data is for it by checking the ID information appended to the top of data.

"Data" transmitted or received by the portable radio apparatus of the present invention means "text data such as e-mail," or "image data such as photograph."

Returning to FIG. 1, when the user performs an operation for transmission with an operation section 14 such as a keyboard, joy stick, light pen, track ball, or the like, the area determination section 4 is located determines whether or not the portable radio apparatus is located within a communication service area. If it is determined that the portable radio apparatus is located within the communication service area, the processing continues as is. Data entered through the operation section 14 and destination information, or the identification number of the destination, are transmitted to the base station (not shown) through the radio section 2 and the transmission/receiving antenna 1.

On the other hand, if it is determined that the portable radio apparatus is not located within the communication service area, or is located outside the communication service area, a transmission operation management section 5 determines whether the transmitted data is predefined routine data such as "I will directly call a customer, today" or "Can you attend the meeting?," user prepared data previously prepared by the user, or temporary data temporarily prepared by the user.

If the transmitted data is determined to be the user prepared data or the temporary data, the transmitted data is stored in a user prepared data memory 10 or a temporary data memory 11. In addition, the transmitted data is compressed according to a compression dictionary stored in a compression section 6, and stored as compressed data in a compressed data memory 13. Moreover, the address of the compressed data, or an address or pointer is stored in a data management memory 7 together with destination information or the identification number of the destination. Data to be transmitted is compressed and stored to save the region used in the memory and to, transmit the data in a compressed form.

On the other hand, if the transmitted data is determined to be the routine data, the address of applicable routine data, or an address or pointer is stored in the data management memory 7 together with the destination information. When the transmitted data is the routine data, it is not compressed in the compression section 6.

The destination information (indicating the desired destination to which the information is to be transmitted) and the address are managed in the transmission operation management section 5. When the user moves from a location outside a communication service area to a location inside the communication service area, data stored in the routine data memory 9, the user prepared data memory 10 and the temporary data memory 11 is automatically transmitted, together with the destination information based on the address stored in the data management memory 7, through the radio section 2 and the transmission/receiving antenna 1.

When transmission reserved data is transmitted, it is desirable that the fact of transmission is displayed on display section 15, for example, a CRT, LCD or the like, so that the user can confirm transmission status. In addition, the temporary data may be automatically deleted from the temporary data memory 11 when a predetermined period of time expires after it is transmitted. In this case, the user can confirm the temporary data on the display section 15 until it is deleted from the temporary data memory 11.

Figure 3:
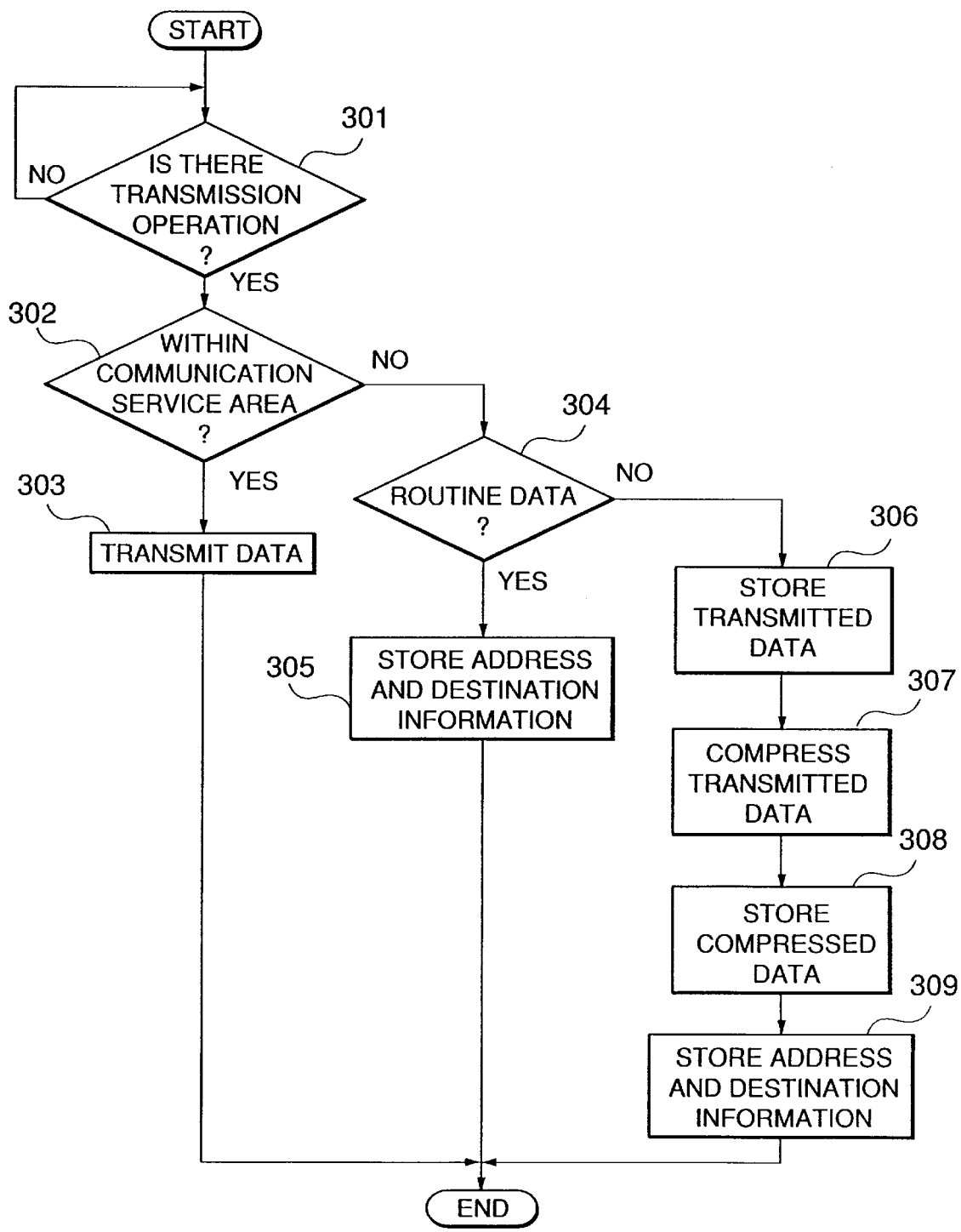
FIG. 3 is a flowchart for illustrating a data storing operation in the preferred embodiment of the portable radio apparatus shown in FIG. 1.

Description is given on a data storage operation in the preferred embodiment of the portable radio apparatus shown in FIG. 1 with reference to FIG. 3.

Referring to FIG. 3, when the user performs the data transmission operation with the operation section 14 (step 301), the area determination section 4 determines, based on the received electric field intensity from the radio section 2 whether or not the portable radio apparatus is located within a communication service area (step 302).

If the portable radio apparatus is determined to be located within the communication service area (YES at step 302), the processing continues. The destination information and data input through the operation section 14 are transmitted to the base station (step 303).

On the other hand, if the portable radio apparatus is determined not to be located within the communication service area, or to be located outside the communication service area (NO at step 302), the transmission operation management section 5 determines whether or not the transmitted data is routine data (step 304).

If the transmitted data is determined to be routine data (YES at step 304), the address and the destination information in the routine data memory 9 are stored in the data management memory 7 (step 305).

On the other hand, if the transmitted data is determined not to be routine data, or to be the user prepared data or temporary data (NO at step 304), the transmitted data is stored in the user prepared data memory 10 or the temporary data memory 11 (step 306). In addition, the transmitted data is compressed in the compression section 6 (step 307), and stored in the compressed data memory 13 (step 308). The address and the destination information in the compressed data memory 13 are stored in the data management memory 7 (step 309).

A data compression method employed for the portable radio apparatus shown in FIG. 1 may be the message data conversion method disclosed in, for example, Japanese laid-open patent application Heisei 7-203515. Description is given on a data compression method for the preferred embodiment of the present invention using a conventional data compression method with reference to FIGS. 4–8.

FIG. 4 is a free message conversion matrix table stored in the compression section 6 shown in FIG. 1. The free message conversion matrix table is utilized when character data is converted into numeric data, or when numeric data is inversely converted into character data.

FIG. 5 is a routine message dictionary to be stored in the compression section 6 shown in FIG. 1. The routine message dictionary stores contents of call or routine messages in correspondence to respective message No. "01–40".

Figure 6:
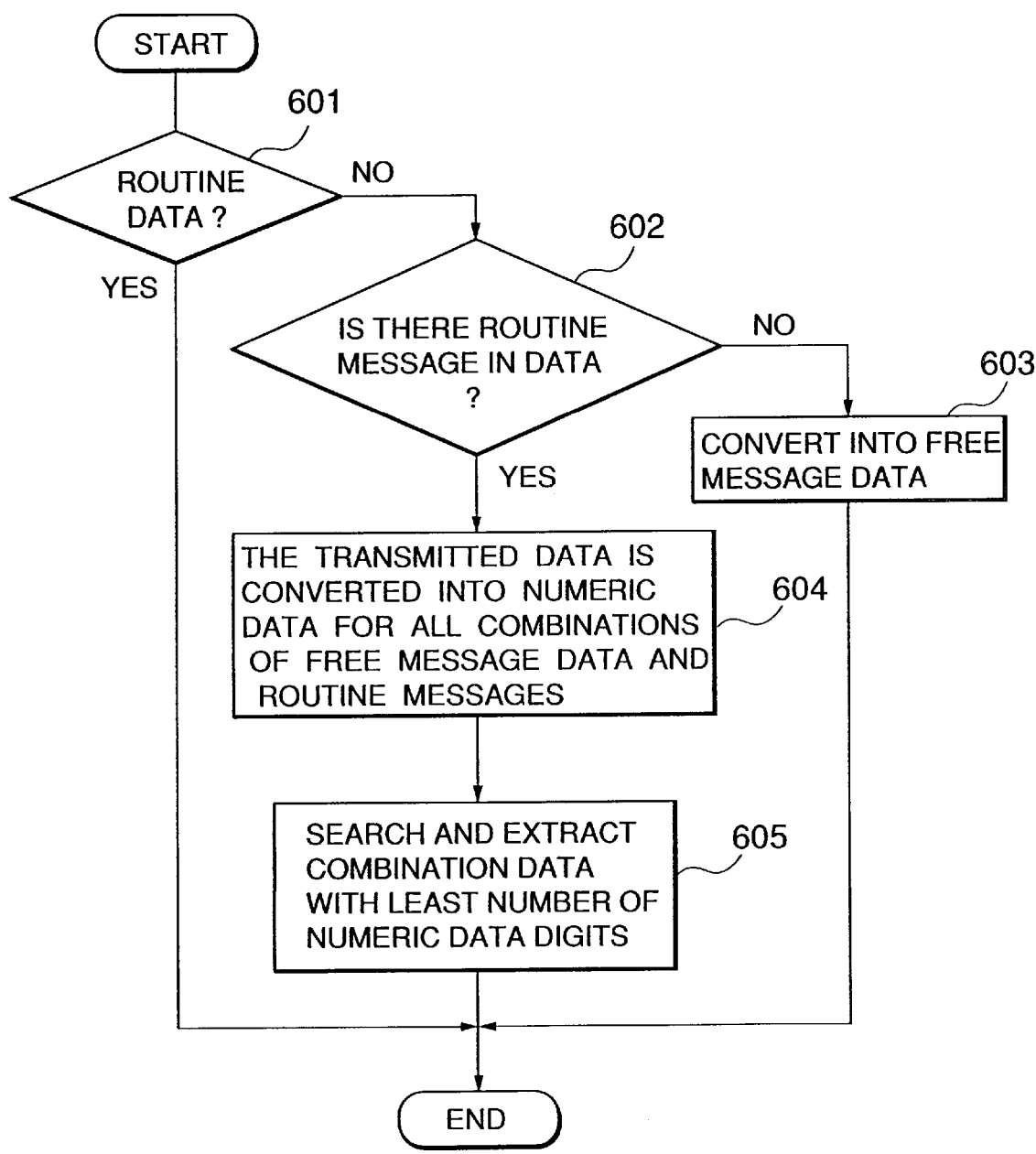
FIG. 6 is a flowchart for illustrating a data compressing operation in the preferred embodiment of the portable radio apparatus shown in FIG. 1.

Description is given on the data compression operation for the preferred embodiment of the portable radio apparatus shown in FIG. 1 with reference to FIG. 6.

Referring to FIG. 6, if the transmission operation management section 5 determines that the transmitted data is not the routine data, or the user prepared data or temporary data (NO at step 601), it is stored in the compression section 6. Then, it is determined whether or not a routine message stored in the routine message dictionary shown in FIG. 5 is contained in the transmitted data (step 602).

If the routine message is not contained in the transmitted data (NO at step 602), the transmitted data is converted into the free message data or numeric data based on the free message conversion matrix table shown in FIG. 4 (step 603).

On the other hand, if the transmitted data contains the routine message (YES at step 602), the transmitted data is converted into numeric data for all combinations of free message data and routine messages (step 604).

Step 604 shown in FIG. 6 is studied in detail. When transmitted data "DO YOU WISH RESERVATION?" shown in FIG. 7(a) is compressed, the transmitted data is analyzed for a conversion pattern for combination with the routine messages. As shown in FIG. 7(b) since components "DO" "RESERVATION" and "?" are stored as messages No. 40, 36 and 30 shown in FIG. 5, respectively, the conversion pattern for this combination becomes conversion patterns of "A"–"H" in FIG. 7(c).

FIG. 8 is results of conversion of the respective conversion patterns shown in FIG. 7(c) into numeric data.

Referring to 8a of FIG. 8, "[[40" "[[36" and "[[30" shown in the numeric data indicate to be data with message number. In addition, numeric data following "U7" indicates to be free message data. Numeric data in this free message data section is to be converted based on the free message conversion matrix table shown in FIG. 4. In addition, 8b of FIG. 8 indicates the number of digits of data in each converted result of 8a of FIG. 8.

Returning to FIG. 6, when data to be transmitted is converted into numeric data in step 604, combination data with the least number of digits shown in 8b of FIG. 8 is detected from all combination conversion patterns shown in FIG. 8 (step 605). That is, the combination conversion patterns "A", "B", "E" and "F" are extracted from 8a of FIG. 8, and "A", "B", "E" or "F" is stored as compressed data in the compressed data memory 13.

The data compression method for the portable radio apparatus of the present invention is not limited to the above embodiment.

Figure 9:
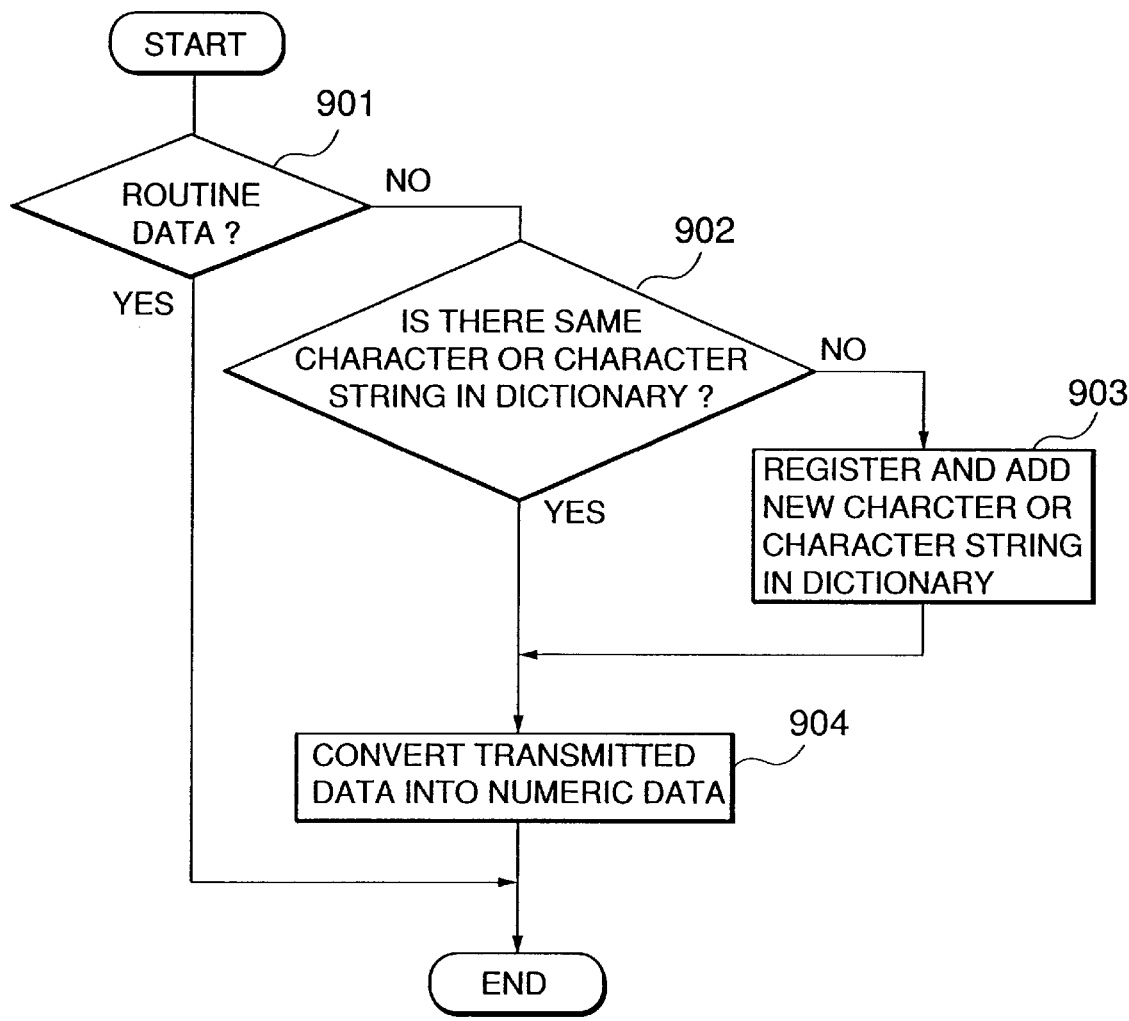
FIG. 9 is a flowchart for illustrating a data compressing operation in another preferred embodiment of the portable radio apparatus shown in FIG. 1.

Description is given on the data compression operation in another preferred embodiment of the portable radio applicates shown in FIG. 1 with reference to FIG. 9.

Referring to FIG. 9, if the transmission operation management section 5 determines the transmitted data not to be routine data, or to be the user prepared data or temporary data (NO at step 901), the transmitted data is searched one byte after another, and each character or character string is examined to whether or not it exists in the compression dictionary in the compression section 6. If all characters or character strings in the transmitted data exist in the compression dictionary, they are converted into corresponding numeric data, and compressed (step 904). If even one of characters or character strings in the transmitted data does not exist in the compression dictionary, the character or character string not existing in the compression dictionary is newly registered and added in the compression dictionary together with numeric data (step 903). Thereafter, the transmitted data is converted into the numeric data newly registered and added in the compression dictionary, and compressed (step 904).

If the newly registered character or character string exceeds the limit capacity of compression dictionary, frequency of use is detected for each character or character string. Then, items not used for an extended period of time, or items with low frequency of use are discarded. In addition, as for management of the compression dictionary, each item is managed with a queue. Thus, it is desirable that, every time an item is used, it is placed at the end of the queue.

Figure 10:
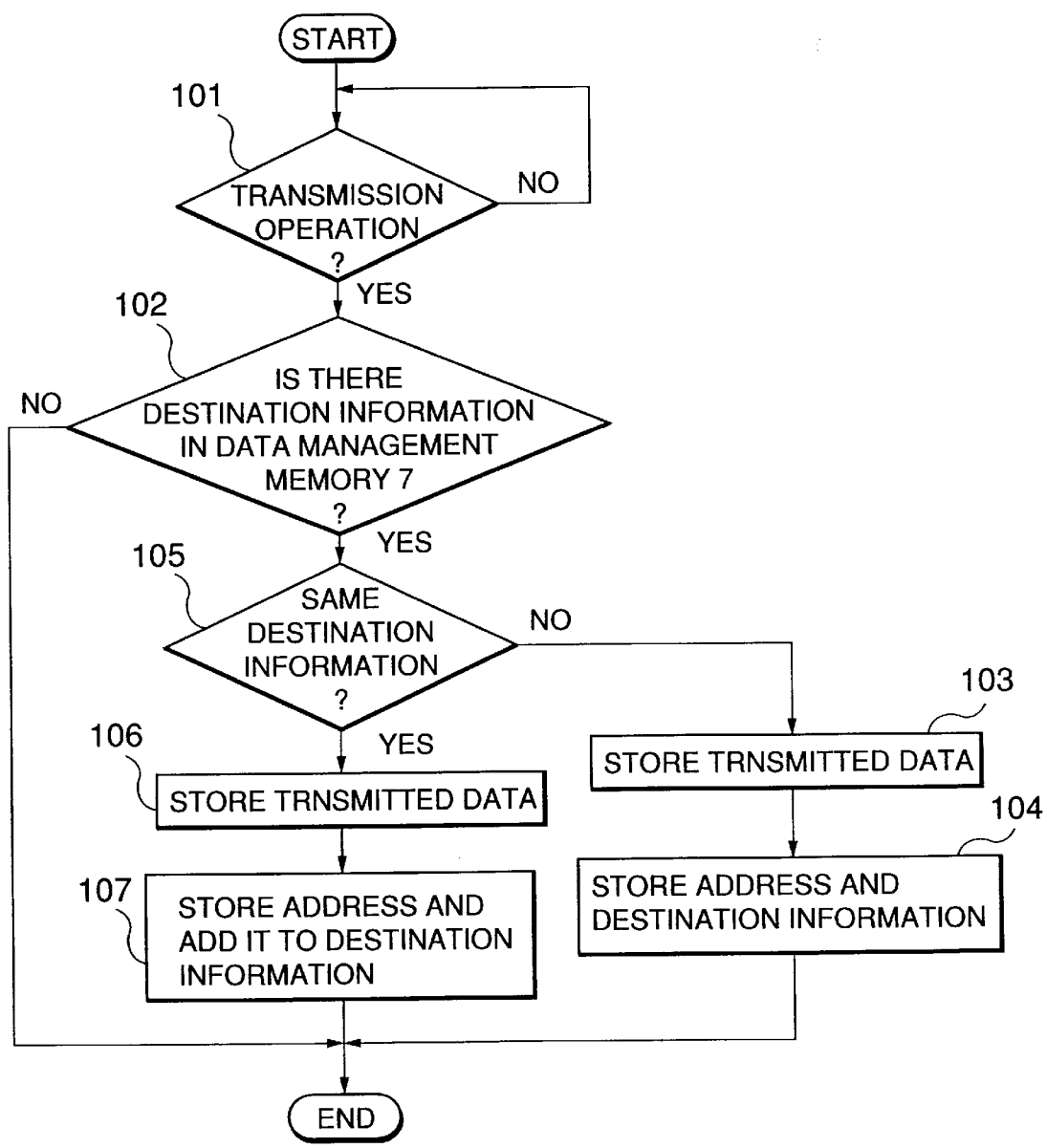
FIG. 10 is a flowchart for illustrating an operation for registering data in transmission reservation information in the preferred embodiment of the portable radio apparatus shown in FIG. 1.

Description is given on a preferred example of operation for registering data in the transmission reserved information when a plurality of data are transmitted to a same destination with reference to FIG. 10.

Referring to FIG. 10, when the user performs the data transmission operation through the operation section 14 (step 101), it is detected whether or not the destination information or the identification number of the destination is stored in the data management memory 7 (step 102).

If the destination information is stored in the data management memory 7 (YES at step 102), it is determined whether or not the destination information of the transmitted data is identical to the destination information in the data management memory 7 (step 105).

If the destination information of the transmitted data is already stored in the data management memory 7 (YES at step 105), the transmitted data is stored in the user prepared data memory 10 or the temporary data memory 11 (step 106). In addition, the transmitted data is compressed and stored in the compressed data memory 13 as compressed data. Moreover, the address in the compressed data memory 13 is stored in the data management memory 7 in addition to the applicable destination information (step 107). Here, if the transmitted data is routine data, the process of step 106 is not performed so that the transmitted data is not compressed.

If the destination information of the transmitted data is not stored in the data management memory 7 (NO at step 105), the process of steps 103 and 104 is performed. The process of steps 103 and 104 is same as the process from step 304 to step 309 shown in FIG. 3, and its description is omitted to avoid redundancy.

Figure 11:
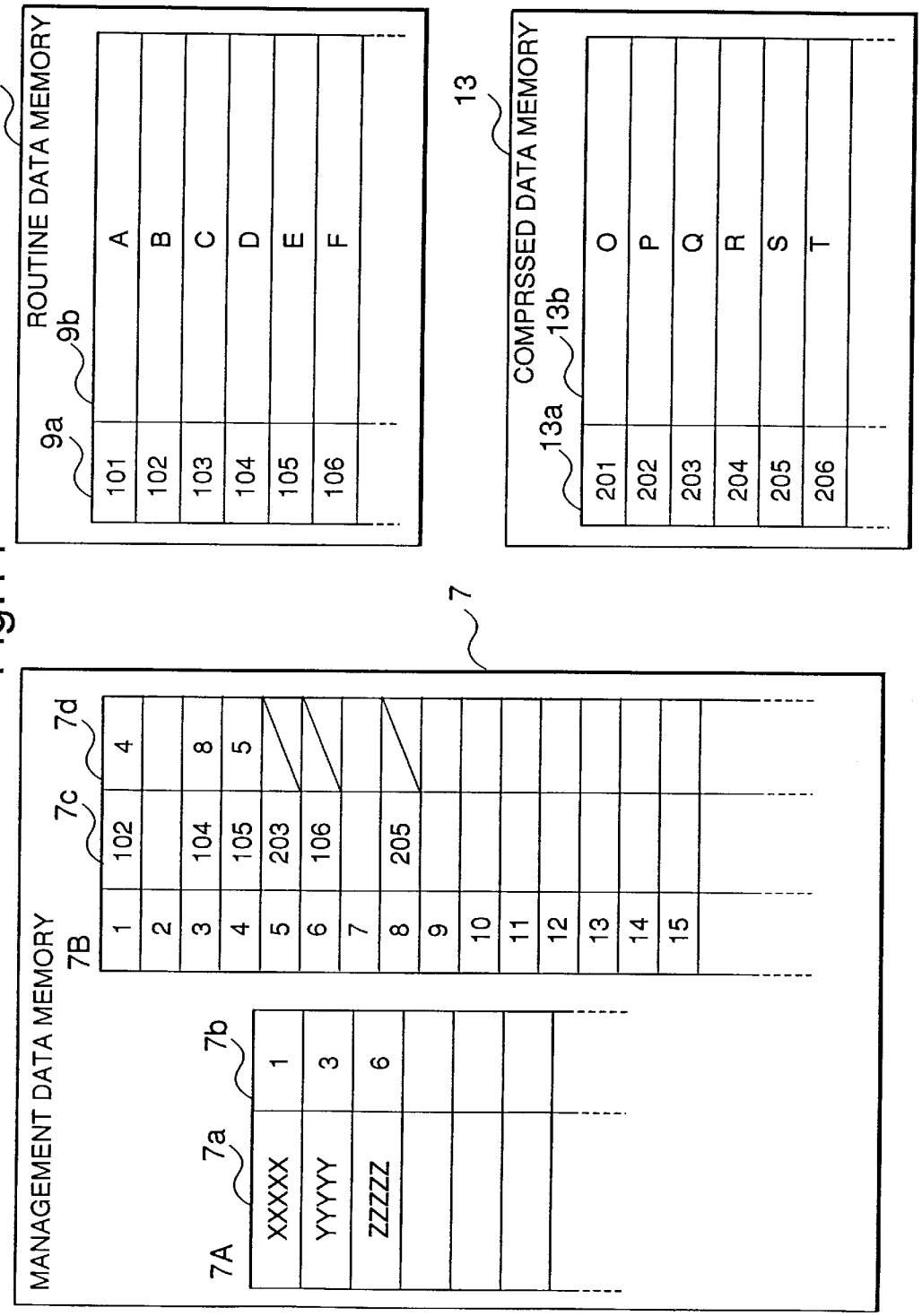
FIG. 11 is a method for managing transmitted data in the preferred embodiment of the portable radio apparatus shown in FIG. 1.

Description is given on a preferred example of the method for managing the transmitted data based on the operation for registering data in the transmission reservation information shown in FIG. 10 with reference to FIG. 11.

Referring to FIG. 11, the data management memory 7 comprises a destination information management table 7A for managing transmission reservation and free status, and an address management table 7B for managing a data storage region and the number of reservations. 7a indicates destination information, or identification numbers of destinations. 7b indicates addresses in the address management table 7B. 7c indicates addresses in the routine data memory 9 and the compressed data memory 13. 7d is similar to 7b, and indicates addresses in the address management table 7B.

Since "1" is indicated in the address 7b for an identification number "XXXXX" of destination, data at "102" is reserved for transmission from the address 7c. In addition, since "4" is indicated in the address 7d, data at "105" is also reserved for transmission from the address 7c. Furthermore, since "5" is indicated in the address 7d, data at "203" is also reserved for transmission from the address 7c. Therefore, data stored at "102", "105" and "203" or routine data "B" and "E" and compressed data "Q" are transmitted to the identification number "XXXXX" of destination.

Similarly, data stored at "104" and "205", or routine data "D" and compressed data "S" are transmitted to an identification number "YYYYY" of destination. Data stored at "106", or routine data "F" is transmitted to an identification number "ZZZZZ" of destination.

When routine data "A" in addition to the compressed data "Q" are transmitted to the identification number "XXXXX" of destination, any empty address, for example "10," in the address management table 7B, for example "10" is stored at the address 7d for "5,", in the address management table 7B. Thus, the routine data "A", or "101" is stored at the address 7c for "10" in the address management table 7B.

Figure 12:
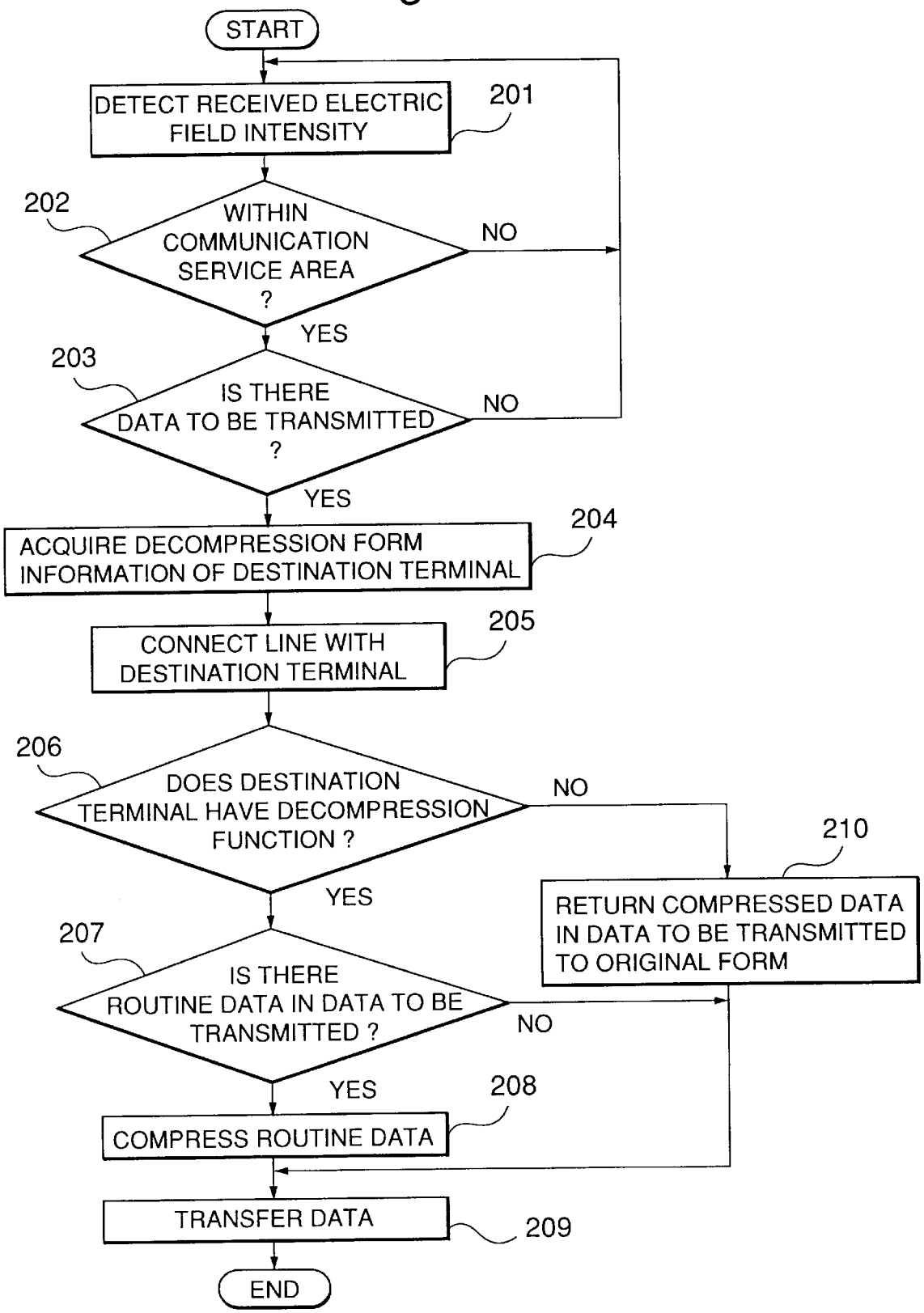
FIG. 12 is a flowchart for illustrating a preferred example of data transmission method when the portable radio apparatus shown in FIG. 1 returns to the state able to communicate.

Description is given on a preferred example of the method for transmitting data when the portable radio apparatus shown in FIG. 1 moves from outside to inside of a communication service area, that is, when it returns to the state able to communicate with reference to FIG. 12.

Referring to FIG. 12, the received electric field intensity is continuously detected for a predetermined time interval, for example, 5 millisecond interval (step 201). The area determination section 4 determines whether or not the portable radio apparatus exists within the communication service area based on the detected received electric field intensity (step 202).

If the portable radio apparatus is determined to be located within the communication service area (YES at step 202), it is determined with the destination information management table 7A in the data management memory 7 on whether or not there exist destination information and data reserved for transmission (step 203).

If it is determined that destination information and data reserved for transmission exist (YES at step 203), a connection request signal is transmitted to a terminal at the destination. Thereafter, a connection response signal is received from the terminal at the destination to obtain information on whether or not the terminal at the destination has a function for decompressing compressed data (step 204). If the information is obtained, a line is connected to the terminal at the destination (step 205). In addition, it is determined whether or not the terminal at the destination has the decompression function based on the information obtained in step 204 (step 206).

Description is given on a preferred example of data structure of the connection request signal transmitted to the terminal at the destination with reference to FIG. 13.

Referring to FIG. 13, connection request information contains a command indicating the establishment of a line, and consists of, for example, 2 bits. In addition, originator ID information contains an ID of the side starting connection of the line, or an ID of an originator terminal, and consists of, for example, 20 bits. Terminating ID information includes an ID of a terminating terminal, and consists of, for example, 20 bits. Furthermore, compression form information contains information on what compression method the data sender used to compress the data, and consists of, for example, 1 bit. Additional information is of variable length, and may consist of any number of bits. Setting of the number of bits is not limited to the above number of bits.

Description is given on the data structure of a preferred example of connection response signal transmitted from the originator terminal with reference to FIG. 14.

Referring to FIG. 14, the connection response information contains a command meaning that a called terminal permits connection of a line, and consists of, for example, 2 bits. In addition, originator ID information contains an ID of the side transmitting permission of connection of a line, or an ID of an originating terminal, and consists of, for example, 20 bits. Terminating ID information contains an ID of a terminating terminal, and consists of, for example, 20 bits. Furthermore, decompression form information contains information on with what decompression method the data receiver decompresses data, and consists of, for example, 1 bit. Additional information is of variable length, and may consist of any number of bits. Setting of the number of bits is never limited to the above number of bits as in the connection request signal.

Returning to FIG. 12, when the originating terminal is determined to have a data decompression function (YES at step 206), the address management section 7B in the data management memory 7 searches whether or not routine data exists in data reserved for transmission (step 207).

If there exists routine data in the transmission reserved data (YES at step 207), the routine data in the transmission reserved data is compressed according to the flowchart for data compression operation shown in FIG. 6 or 9 (step 208). The compressed routine data is transferred to the destination terminal together with the compressed data stored in the compressed data memory 13 in a batch (step 209).

If the destination terminal is determined not to have the required decompression function in the process of step 206 (NO at step 206), the compressed data stored in the compressed data memory 13 is decompressed to its original form, or to the user prepared data or temporary data (step 210). The decompressed data is transferred to the destination terminal together with routine data stored in the routine data memory 9 in a batch (step 209). That is, all the transmission reserved data are transferred to the destination terminal in a non-compressed form.

If there does not exist routine data in the transmission reserved data in the process of step 207 (NO at step 207), the transmission reserved data, or the compressed data stored in the compressed data memory 13 is transferred to the destination terminal in the compressed form in a batch (step 209).

FIG. 15 is a sequence chart for illustrating the data transmission method when the portable radio apparatus returns to the state able to communicate shown in FIG. 12.

Referring to FIG. 15, when the originating terminal moves from outside to inside of a communication service area, and starts transmission of data, the originating terminal first transmits a connection request signal. A terminating terminal receives the connection request signal transmitted from the originating terminal, and transmits a connection response signal to the originating terminal. The originating terminal transmits the transmitted data to the terminating terminal after confirming receipt of the connection response signal transmitted from the terminating terminal.

In the above-mentioned embodiment, the transmitted data is categorized into three categories of (1) data frequently used in data exchange and previously stored in the apparatus body, or routine data, (2) data personally and frequently used by the user, or user prepared data, and (3) data temporarily prepared by the user, or temporary data. However, the transmitted data may be categorized into two categories by deleting either one of routine data or user prepared data. If the routine data is deleted, that is, if the transmitted data is categorized into two categories of user prepared data and temporary data, since the routine data is not previously stored in the apparatus body, the user is necessary to previously input data frequently used in data exchange as the user prepared data. However, in this case, the routine data memory 9 shown in FIG. 1 is not required to be provided. On the other hand, if the user prepared data is deleted, that is, if the transmitted data is categorized into two categories of routine data and temporary data, since the user prepared data cannot be previously stored in the apparatus body, when the user transmits data frequently used, he or she is necessary to input such data every time as temporary data. In this case, however, there is no need to provide the user prepared data memory 10 shown in FIG. 1. The transmitted data is not limited to be categorized into two or three categories, but may be categorized into any number of categories.

In addition, in the above embodiment, when the portable radio apparatus moves from outside to inside of a communication service area, and the transmission reserved data is automatically transmitted, transmission of the data is displayed on the display section 15. However, it is not limited to the display section 15 to notify the user of the transmission of data. For example, it may be possible to provide a speaker or LED in the portable radio apparatus to notify the transmission with sound or light.

Furthermore, although the above embodiment provides the data management memory 7 in the control section 3, it may be provided in the memory 8.

Furthermore, the above embodiment determines in the area determination section 4 whether or not the portable radio apparatus exists in a communication service area for a predetermined time interval, for example, for 5 millisecond interval. Then, when data is to be transmitted, it is transmitted based on the result of area determination stored in the area determination memory 12. However, the timing for determining whether or not the portable radio apparatus exists within the communication service area is not limited to the predetermined time interval. For example, when the user performs the data transmission operation, the area determination section 4 may be arranged to determine whether or not the portable radio apparatus exists within the communication service area. In this case, since it is determined whether or not the portable radio apparatus exists within the communication service area every time data is transmitted, there is no need to provide the area determination memory 12.

Furthermore, in steps 304 through 309 shown in FIG. 3, compression is not performed when the transmitted data is routing data, while it is performed when the transmitted data is not routine data. However, the routine data may be stored in a previously compressed form. In this case, there is no need to provide the routine data memory 9 shown in FIG. 1. The compressed routine data is stored as compressed data in the compressed data memory 13. Then, the process in steps 207 and 208 shown in FIG. 12 is not performed when data is transmitted. Accordingly, all data are transmitted in the compressed form as it is regardless of the type of data. In addition, in steps 306 through 309 shown in FIG. 3, the transmitted data is compressed when it is user prepared data or temporary data. However, although the user prepared data is previously stored in the user prepared data memory 10 as data frequently used by the user, it may be stored in a previously compressed form. When the user prepared data is compressed, it is preferable that the user inputs the user prepared data through the operation section 14, while the inputted user prepared data is compressed. In this case, there is no need to provide the user prepared data memory 10 shown in FIG. 1. The compressed user prepared data is stored in the compressed data memory 13 as compressed data. That is, the routine data and the user prepared data are stored in a previously compressed form, and data compression is performed only when the temporary data is inputted. Therefore, the memory 8 consists of only the temporary data memory 11, the area determination memory 12 and the compressed data memory 13.

In addition, the portable radio apparatus may be applied as a portable telephone set. In this case, since the portable telephone set does not typically have a function for storing audio messages, phone numbers are stored instead of the audio messages. That is, when the portable telephone set moves from outside to inside of a communication service area, a phone number instead of an audio message is automatically transmitted, and a call is established. However, there may be,such situation of the user where he or she cannot call immediately after the user enters in the communication service area, for example, where he or she is driving a car. Therefore, it is preferable that the phone number is automatically transmitted as a predetermined time interval expires after the user enters in the communication service area. Alternatively, it is preferable that the phone number is transmitted as the user operates a switch or the like (not shown).

Furthermore, if both the originating portable telephone set and the terminating portable telephone set have a function for converting an audio message into an audio signal, and a function for converting an audio signal into an audio message, an audio message generated by the user is converted into an audio signal at the originating portable telephone set, and transmitted to the terminating portable telephone set. On the other hand, at the terminating portable telephone set, a received audio signal is converted into an audio message. With such approach, the user can automatically transmit not only a phone number but also an audio message.

As described above, according to the present invention, when the user performs a data transmission operation outside a communication service area, destination information and transmitted data are temporarily held in the portable radio apparatus. When the portable radio apparatus moves in a communication service area, that is, when the portable radio apparatus becomes a state able to communicate, the held data is transmitted. Accordingly, it is possible to eliminate such situation that the user cannot perform a transmission operation outside a communication service area.

In addition, the user can perform the transmission operation whether or not he or she is within a communication service area. Therefore, there is no need for the user to ascertain from time to time whether or not the portable radio apparatus exists within a communication service area by using the display section or the like.

In addition, when the portable radio apparatus moves from outside to inside of the communication service area, data held outside the communication service area is automatically transmitted. Therefore, the user needs not to transmit the held data within the communication service area.

Furthermore, data frequently used in data exchange or routine data is previously stored in the portable radio apparatus body. Moreover, the user can previously store data which he or she personally and frequently uses or user prepared data in the portable radio apparatus body. Therefore, the transmission operation performed by the user can be simplified.

Furthermore, when the user performs an operation for transmitting data outside a communication service area, if the transmitted data is user prepared data, or any data temporarily prepared by the user or temporarily data, the transmitted data is compressed, and stored in the memory as compressed data. Therefore, since much data is reserved for transmission with a less memory capacity, the portable radio apparatus can be reduced in its body size.

In addition, when the user performs an operation for transmitting data outside a communication service area, destination information of the transmitted data or the identification number of the destination is ascertain on whether or not it is already registered in transmission reservation data. If the destination information is already registered, only the transmitted data is added to the already registered destination information. When the data is to be transmitted, since the transmission reserved data is transmitted in a batch, the communication line can be effectively utilized. That is, a plurality of data are transmitted together to one destination with only single transmission, the number and time of transmission of reserved data are reduced as a whole.

In addition, if a destination terminal has a function for decompressing compressed data, all transmitted data can be transmitted to the destination terminal in a compressed form in a batch, so that a communication line can be further effectively utilized.

Furthermore, as the number and time of transmission of reserved data are reduced, driving time by a battery in the portable radio apparatus can be extended. In addition, the user can use the portable radio apparatus body for a long period of time.

Obviously, numerous additional modifications and variations of the present invention are possible in light of the above teachings. It is, therefore, to be understood that within the scope of the appended claims, the invention may be practiced otherwise than as specifically described herein.

What is claimed is:

1. A portable radio apparatus comprising:
   memory for storing, while said portable radio apparatus is located outside a communication service area, data to be transmitted and destination information concerning a destination to which the data is to be transmitted when the radio apparatus is located within said communication service area;
   determination section for determining whether or not said destination information is already stored in said memory;
   adding section for adding only said transmitted data to said destination information stored in said memory when said destination information is determined by said determination section to already be stored in said memory;
   data compression section for compressing said data to be transmitted; and
   transmission section for automatically transmitting a plurality of said data to be transmitted stored in said memory in a batch based on said destination information when said portable radio apparatus is within said communication service area.

2. A portable radio apparatus comprising:
   a memory for storing, while said portable radio apparatus is located outside a communication service area, data to be transmitted and destination information indicating the destination to which said data is to be transmitted when said portable radio apparatus is located within a communication service area;
   data compression section for compressing said data to be transmitted;
   data decompression section for decompressing said data compressed by said data compression section;
   determination section for determining whether or not said destination to which said data is to be sent has said data decompression section; and
   transmission section for automatically transmitting said data to be transmitted and stored in said memory to said destination based on the result of said determination made by said determination section when said portable radio apparatus is located within said communication service area.

3. The portable radio means as claimed in claim 2, wherein said transmission section transmits said data compressed by said data compression section when said destination is determined by said determination section to have said data decompression section.

4. The portable radio apparatus as claimed in claim 2, wherein said transmission section decompresses said data compressed by said data compression section and transmits said decompressed data when said destination is determined by said determination section not to have said data decompression section.

5. The portable radio apparatus as claimed in claim 2, wherein said determination section determines whether or not said destination has said data decompression section by transmitting a connection request signal to said destination and receiving a connection response signal from said destination.

6. A portable radio apparatus comprising:
   a memory for storing data to be transmitted and information concerning the destination to which such data is to be transmitted once said radio apparatus is located inside a communication service area; and
   transmission section for automatically transmitting a plurality of said transmitted data stored in said memory in a batch to a common destination based on said destination information which said radio apparatus is located within said communication service area;
   determination section which determines whether or not said destination information is already stored in said memory; and
   adding section for adding only said data to be transmitted to said destination information stored in said memory when said destination information is determined by said determination section to already be stored in said memory.

7. The portable radio apparatus as claimed in claim 6, wherein said portable radio apparatus comprises a portable telephone set.

8. A portable radio apparatus comprising:
   a memory for storing data to be transmitted and destination information indicating the destination to which said data should be transmitted when said radio apparatus is located in a communication service area;
   a transmission operation management section for determining whether or not said destination information is already stored in said memory, and for adding only said data to be transmitted to said destination information stored in said memory when said destination information is determined to already be stored in said memory;

a compression section for compressing said data to be transmitted;

a decompression section for decompressing said data to be transmitted which was compressed by said compression section; and a transmission section for automatically transmitting a plurality of said data to be transmitted which are stored in said memory in a batch based on said destination information when said radio apparatus is located within said communication service area.

9. The portable radio apparatus as claimed in claim 8, further comprising a control section for determining whether said data to be transmitted is first data previously stored in said portable radio apparatus or second data arbitrarily prepared by the user.

10. A method for operating a portable radio apparatus, said method comprising the steps of:

determining whether or not destination information and data to be transmitted are inputted;

storing said destination information and said data to be transmitted;

determining whether or not an operation is performed for transmitting said data;

determining whether or not said portable radio apparatus is located within a communication service area;

detecting whether or not said destination information for said data is already stored when said portable radio apparatus is determined not be located within the communication service area;

adding only said data to said destination information already stored when said destination information is already stored; and transmitting said data to a location indicated by said destination information in a batch when said portable radio apparatus is determined to be located within the communication service area.

11. A method for operating a portable radio apparatus comprising the steps of:

determining whether or not data to be transmitted is inputted;

determining whether or not an operation is performed for transmitting said data;

compressing said data;

determining whether or not said portable radio apparatus is located within a communication service area;

determining whether or not a radio apparatus to which said data is to be transmitted has data decompression means capable of decompressing said compressed data; and transmitting said compressed data when said radio apparatus to which said data is to be transmitted has said data decompression means.

12. The method as claimed in claim 11, further comprising the steps of:

decompressing said compressed transmitted data when said radio apparatus to which said data is to be transmitted does not have said data decompression means; and transmitting said decompressed transmitted data.

13. A portable radio apparatus comprising:

memory for storing data to be transmitted and destination information to which said data is to be transmitted when said portable radio apparatus is located within a communication service area;

a determination section for determining whether or not said destination information is already stored in said memory;

an adding section for adding only said data to said destination information stored in said memory when said destination information is determined by said determination section to already be stored in said memory; and a transmission section for transmitting a plurality of said data store in said memory in a batch based on said destination information when said portable radio apparatus is located within said communication service area.

* * * * *